June 5, 1956     P. N. SITTON     2,749,303
SEPTIC TANK

Filed Sept. 2, 1952     2 Sheets-Sheet 1

INVENTOR
PHILIP N. SITTON
BY Toulmin & Toulmin
ATTORNEYS

June 5, 1956 P. N. SITTON 2,749,303
SEPTIC TANK

Filed Sept. 2, 1952 2 Sheets-Sheet 2

INVENTOR
PHILIP N. SITTON
BY Toulmin & Toulmin
ATTORNEYS

United States Patent Office 2,749,303
Patented June 5, 1956

2,749,303

SEPTIC TANK

Philip N. Sitton, Dayton, Ohio, assignor to The Philip Sitton Septic Tank Company, Dayton, Ohio, a corporation of Ohio Application September 2, 1952, Serial No. 307,426

2 Claims. (Cl. 210—6)

My present invention relates to a septic tank structure.

In septic tank operation, the sewage which enters the inlet of the tank contains solid matter which is acted upon by bacteria, and over a period of time a sludge is formed on the base of the tank and a scum occurs at the liquid level. Accordingly, while some vertical movement of particles is constantly taking place in both the upward and downward directions, the area between the sludge and scum lines is relatively free of solids. The bacterial action, it may be noted, has a further improtant effect however in that in induces the formation of corrosive acids which renders the whole solution acidic.

It is desirable in such operations that the liquid leaving the tank be as pure as possible in order that the drain fields will be protected, and that the life of the installation will be as long as possible. To assist in these attainments it has been suggested to provide a multi or two compartment septic tank having means of communication between the first or settling compartment and the second or outlet compartment. Such suggested means have included the provision of a terra cotta conduit or soil pipe which extends upwardly from the central portion of the settling compartment and downwardly to approximately the same depth in the second compartment, the conduit being effective to permit the liquid which is relatively free of solids to flow therethrough to the outlet compartment. However this conduit is subject to considerable acid deterioration as it is positioned in the settling compartment where the effect of acids newly generated is great and deterioration of the conduit accordingly occurs.

It has been further considered that it is desirable to aerate the liquid flowing between compartments to thereby increase the efficiency of the operation, with particular relation to bacterial action.

It is within the contemplation of this invention to overcome the defects of prior art structures, which defects are associated with the positioning of the conduit in the setting compartment of the septic tank. For example the acidic nature of the liquid in the settling tank and the large area of contact of the conduit with the liquid induces extensive corrosion in even the terra cotta material and deterioration of the conduit results. Should such deterioration occur in the area of the scum line considerable solids would pass to the outlet compartment.

It is a principal object of this invention to provide for aeration of the liquid which passes from a settling compartment to an outlet compartment.

It is an important object of this invention to provide in a septic tank as an integral part a structure for the passing of liquid between compartments which structure is no more subject to corrosion than the septic tank itself.

It is a particular object of this invention to provide in a septic tank a structure for the passing of liquid between compartments, which structure is an integral part of the tank and does not require particular sealants to maintain it in position.

It is a further object of this invention to provide a septic tank structure which will operate in conformance with the requirements of the various state, local and Federal laws.

It is another object of this invention to provide a septic tank structure which improves the purity of the liquid flowing to the outlet.

These and other allied objectives of the invention are attained by providing an internal wall across the septic tank adjacent the outlet thus forming an outlet compartment, and then positioning between the wall and the outlet, means to control the direction of liquid flow from the settling chamber or settling compartment. Substantially this flow control means comprises a conduit in loop form having one end thereof connected with an opening in the internal wall of the tank which wall partitions the settling compartment from the outlet compartment, the other end of the loop exhausts into the outlet compartment. The loop conduit is thus positioned entirely within the outlet compartment and out of the area of the most active acid action.

The looped conduit preferably comprises a pair of passages with a partition therebetween; the liquid passes from a vertically mediate portion of the settling compartment where the liquid is substantially clean, upwardly through a first passage, over the partition and downwardly through a second passage to the outlet compartment. With this structural arrangement acid, freshly formed by bacterial action, will not come in contact with the looped conduit and a major corrosive influence is accordingly avoided. Further since the liquid courses over an open partition aeration is readily achieved.

The looped conduit may itself be made of cement and positioned on the green inner wall for integral union therewith; thus, upon setting of the wall the cement conduit is securely adhered thereto without the necessity of introducing any holding means which might be subject to the corrosive influences of the acids.

It is also to be noted that as the course of the liquid from the settling chamber is upwardly from the opening in the internal wall those particles which might pass the opening will tend to settle as the liquid passes upwardly. While some very small amount of solids may pass to the outlet compartment this compartment has sufficient capacity to permit some further settling therein and substantially only clean liquid will pass through the tank outlet.

Since the internal wall of the septic tank may be subjected to stress during pumping of the sludge from the tank this wall is broken away slightly at the base thereof to permit sludge and liquid to move between the settling chamber and the outlet compartment.

The invention will be more fully understood by reference to the following detailed description and accompanying drawings wherein.

Figure 1:
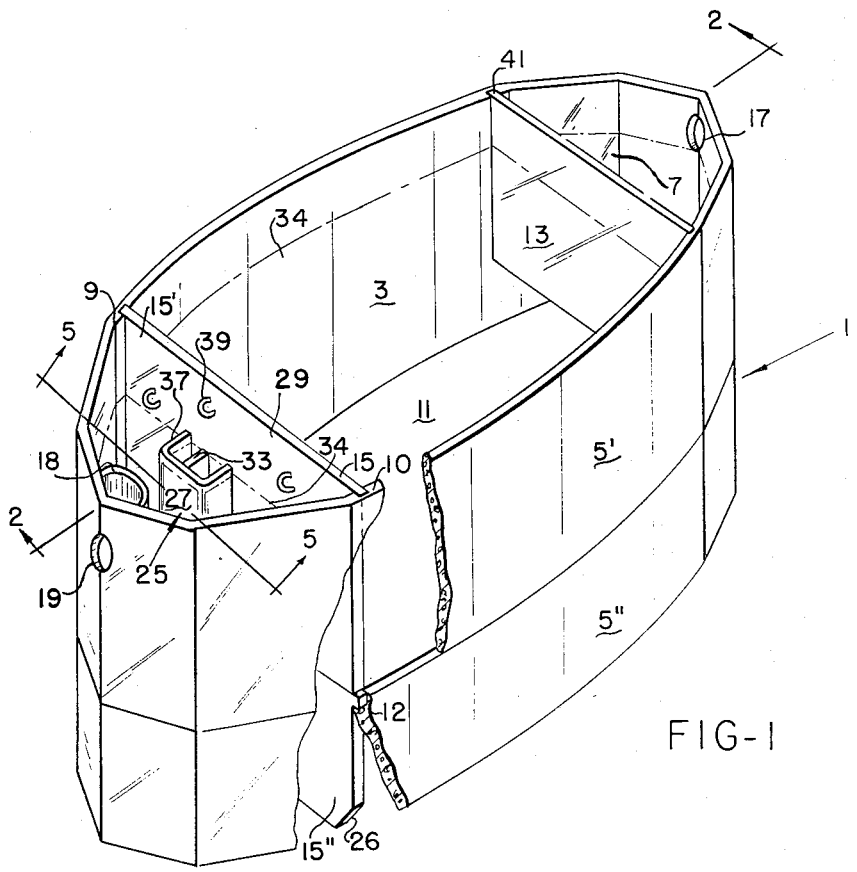
Figure 1 is a perspective view partially sectioned, of a septic tank embodying the precepts of this invention.

Referring to the drawings there is shown generally at 1 in Figure 1 a septic tank of substantially elliptical shape having side walls 3, 5 and end compartments 7, 9. Settling chamber 11 is defined by the side walls 3, 5, a removable baffle 13 which, as may be noted from Figure 2, extends only part way down the chamber wall and is keyed thereto as at 41 (Figure 1), and an internal wall 15. Compartment 7 is provided with an inlet 17 while outlet compartment 9 has an outlet 19. A plate 18 hinders the movement of any slurry formed on the liquid surface to the outlet.

Figure 2:
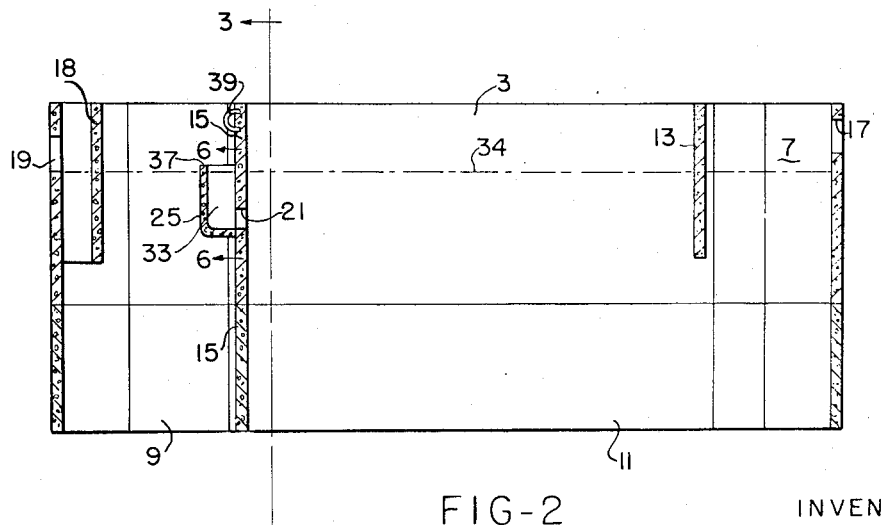
Figure 2 is a sectional view taken on line 2—2 of Figure 1.
Figure 3:
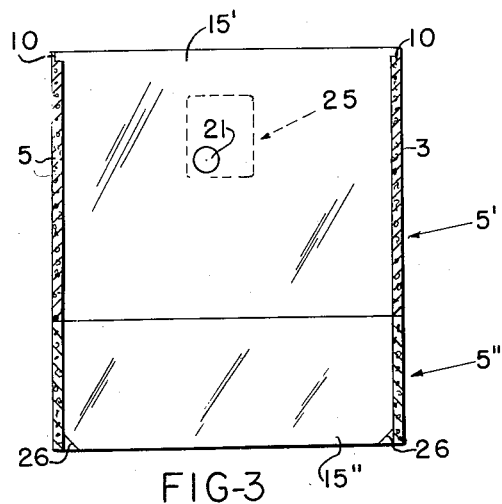
Figure 3 is a sectional view taken on line 3—3 of Figure 2.
Figure 4:
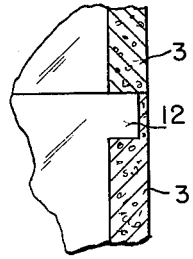
Figure 4 is an enlarged section view of a portion of the right hand wall of Figure 1.
Figure 5:
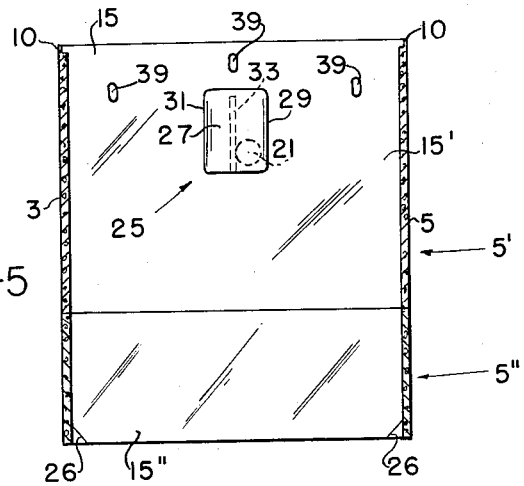
Figure 5 is a sectional view taken on line 5—5 of Figure 1.
Figure 6:
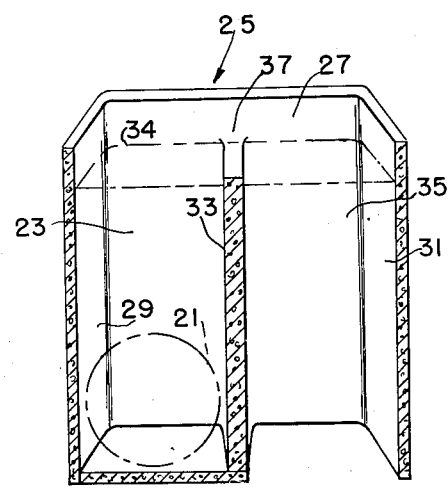
Figure 6 is a view taken on line 6—6 of Figure 2.
Figure 7:
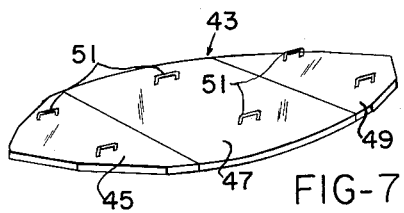
Figure 7 is a perspective view of a cover for the septic tank.

Internal wall 15 as shown more clearly in Figures 2 and 3 is provided with an opening 21 which communicates with a passage 23 (Figure 6) in a loop shaped conduit or member 25. Normally this opening 21 will be positioned at least 6 inches below the liquid level of chamber 11 as the slurry level may attain this depth. Member 25 as shown in Figures 1 and 6 is positioned between the outlet 19 and wall 15 and is secured to the latter as indicated. This member 25 comprises a main wall portion 27, side walls 29, 31 and a central partition 33. The wall 15 as shown closes the member 25 on the remaining side thereof.

Partition 33 extends upwardly from the base of member 25 transversely to the wall 15 and separates passage 23 from passage 35 (Figure 6), the only connection between the two being indicated at the top edge of partition 33 as a passage 37. Accordingly liquid flowing into passage 23 must rise to the height of passage 37 before it may course downwardly through passage 35 into outlet compartment 9. Thus the height of partition 33 determines the liquid level 34 which may be obtained in settling chamber 11. Partition 33 terminates below the top of member 25 in order that all liquid flow will be directed to passage 35. Thus the member 25 comprises conduit means positioned wholly in the outlet compartment, which conduit means defines a vertically looped course for the flow of liquid from the settling chamber 11 to outlet compartment 9.

Internal wall 15 which supports the member 25 may also be provided with a small aperture as indicated at 26 in Figure 1; this aperture should be positioned closely adjacent the bottom of the tank and serve to connect compartment 9 and chamber 11 and provides a pressure relief for sludge to move between 11 and 9. This aperture is of particular utility when chamber 11 is being cleaned or pumped free of bottom residue.

Wall 15 is also provided as indicated at 39 with hooks or hangers to facilitate the installation of wall 15.

The tank itself is preferably of concrete and constructed of an upper section and a lower section as indicated at 5' and 5" which are keyed to the walls as at 10 and 12. The wall 15 is also made in two sections 15' and 15" and these sections and baffle 13 are each secured to the tank walls at their upper edges by keys as at 41 as shown in connection with the baffle 13. A cover 43 having three sections 45, 47, 49 is adapted to close the top of the tank and is provided with means 51 for removing the same from the tank proper.

In operation sewage flowing into opening 17 courses downwardly beneath baffle 13 into settling chamber 11. Initially some slight amount of the fluid may pass through aperture 26 into outlet compartment 9 but as the sludge builds up this opening will be substantially closed by sludge. As the height of the liquid rises in the settling chamber sludge will settle out, bacterial action taking place concurrently therewith until the liquid level reaches that of opening 21. The liquid at this opening will be relatively clean but may contain as a product of the bacterial action a very small amount of scum which may enter the opening. As the liquid level continues to rise however to the passage 37 the main portion of scum is retained in chamber 11 and the minute amount which passes into compartment 9 may settle out therein. When the liquid level reaches passage 37 which is coincident with liquid level 34 in chamber 11 free flow of liquid takes place into chamber 9. However, it is to be noted that the liquid passing into opening 21 and through passages 23, 37, 35 is free of both surface scum and bottom sludge since the liquid is taken off at a point between these layers. The exact position of aperture 21 on the wall 15 is not critical but should be sufficiently well up that the sludge depth will not rise to the same under normal operating conditions, and sufficiently below the surface to inhibit flow of surface scum thereto. Preferably opening 21 is positioned about two-thirds of the way down the tank from the operating liquid level.

While as noted some flow may occur to compartment 9 through aperture 26 in the early stages of operation the sludge will normally accumulate at the aperture rapidly and close the same well before the liquid level rises to the level of outlet 19 in compartment 9. Accordingly the prime portion of material passing into this latter compartment will come through passage 35 and will be exceedingly clean. Any solids that do pass will have of course opportunity to settle out in compartment 9.

It will thus be noted that there has been provided a septic tank structure which will pass only thoroughly clean liquid to the outlet. Accordingly the underground tile or drain field receiver requires less maintenance.

It is further to be noted that the structural makeup of the tank may be readily accomplished when the same is of cement or concrete or reinforced concrete since normal production processes will apply and it is only necessary to separately form the member 25 and while still green place it on the green wall 15, allowing the two to set together. While the integral structure thus formed is not essential it is advantageous from strength and production lost points of view.

It will be understood that this invention is suceptible to modification in order to adopt it to different usages and conditions and accordingly, it is desired to comprehend such modifications within this invention as may fall within the scope of the appended claims.

I claim:

1. A septic tank comprising an inlet and outlet disposed near the top of the tank and at opposite ends, a substantially vertical wall dividing the tank into a settling chamber and an outlet compartment, said vertical wall having an opening in the upper portion thereof, a loop-shaped conduit communicating with said wall opening, said conduit having a partitioning wall therein dividing the conduit into an inlet and outlet chamber, said inlet chamber communicating with said wall opening near the bottom of said conduit inlet chamber, said outlet chamber communicating with the outlet compartment of said tank, the top of said conduit partitioning wall being disposed above said wall opening whereby liquid flowing through said wall opening and into said conduit inlet chamber rises to the height of said partitioning wall of the conduit before coursing downwardly into the outlet chamber of the conduit and into the outlet compartment of said tank, and vertically disposed baffle means arranged in said outlet compartment for hindering the movement of slurry into said last-mentioned outlet.

2. A septic tank comprising an inlet and outlet disposed near the top of the tank and at opposite ends, a substantially vertical wall dividing the tank into a settling chamber and an outlet compartment, said vertical wall having an opening in the upper portion thereof, a loop-shaped conduit carried by said vertical wall and communicating with said wall opening, said conduit having a partitioning wall therein dividing the conduit into an inlet and outlet chamber, said inlet chamber communicating with said wall opening near the bottom of said conduit inlet chamber, said outlet chamber communicating with the outlet compartment of said tank, the top of said conduit partitioning wall being disposed above said wall opening whereby liquid flowing through said wall opening and into said conduit inlet chamber rises to the height of said partitioning wall of the conduit before coursing downwardly into the outlet chamber of the conduit and into the outlet compartment of said tank, and vertically disposed baffle means arranged in said outlet compartment for hindering the movement of slurry into said last-mentioned outlet.

References Cited in the file of this patent

UNITED STATES PATENTS

| | | |
|---|---|---|
| 1,179,327 | Kearney | Apr. 11, 1916 |
| 1,349,452 | Griffith | Aug. 10, 1920 |
| 1,401,182 | Overton | Dec. 27, 1921 |
| 2,078,260 | Mallory | Apr. 27, 1937 |

FOREIGN PATENTS

| | | |
|---|---|---|
| 647,548 | France | July 31, 1928 |